Figure 1:
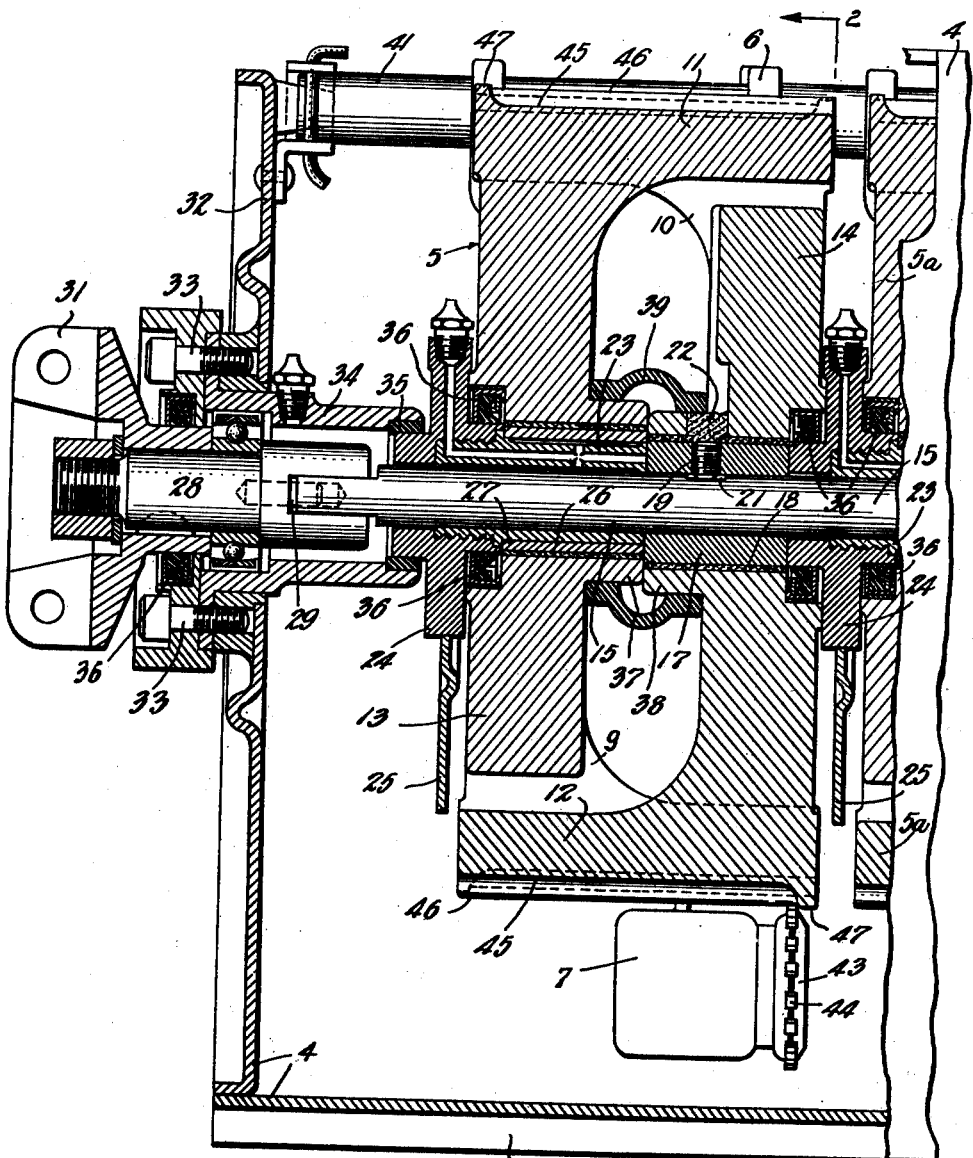

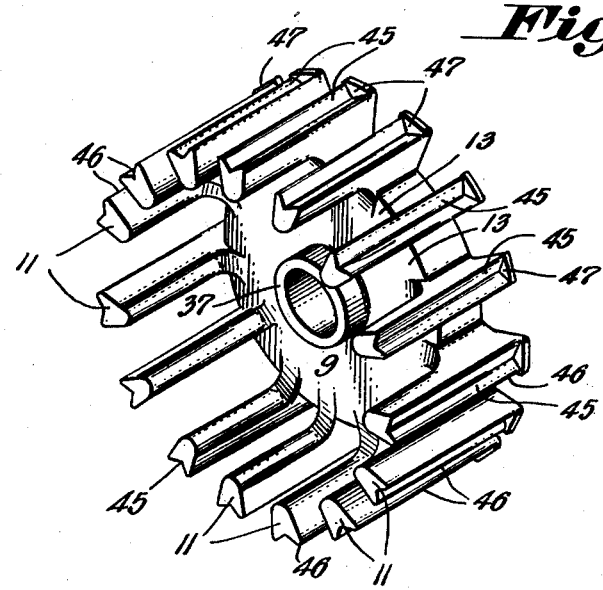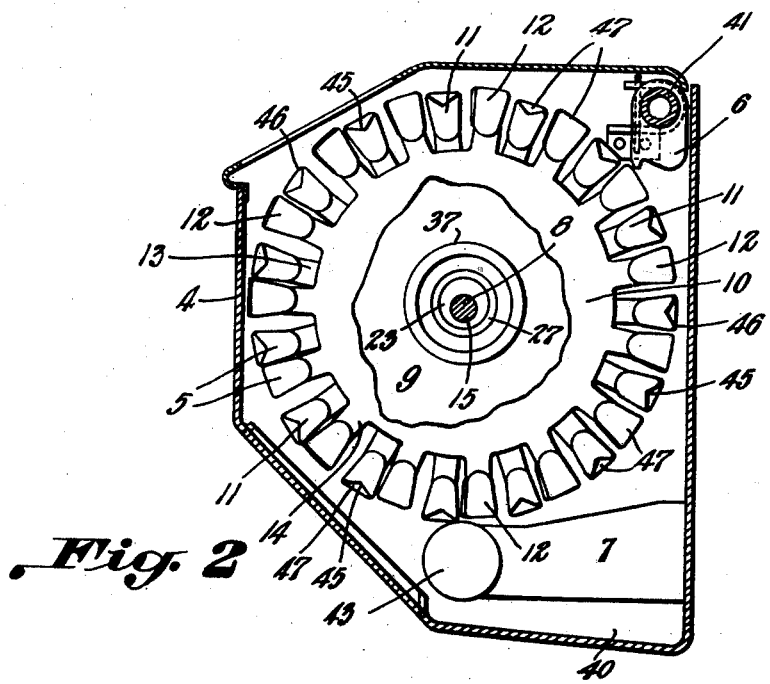

Patented June 17, 1941

2,246,468

UNITED STATES PATENT OFFICE 2,246,468

REEL FOR HANDLING THREAD OR THE LIKE

Walter F. Knebusch, Rocky River, Ohio, assignor to Industrial Rayon Corporation, Cleveland, Ohio, a corporation of Delaware Original application August 27, 1937, Serial No. 161,231. Divided and this application September 12, 1939, Serial No. 294,456

3 Claims. (Cl. 242—53)

This invention relates to improvements in reels for handling strip material such as thread or the like (hereinafter referred to as "thread").

More particularly, the invention relates to an improved form of thread-advancing reel which, during rotation of the reel, operates to wind thread thereon, advance it lengthwise thereof in a plurality of spaced, generally helical turns, and deliver it to a suitable take-up device. Among other things, the invention contemplates a reel made up of two reel members each of which embodies a plurality of spaced, longitudinally extending bars interleaved with those of the other reel member, said bars having associated therewith means for preventing endwise discharge of the thread. To that end, each of the reel members is provided with radially extending projections which in the assembled reel operate as thread-guiding elements.

The present application is a division of application Serial No. 161,231, which is itself a division of Patent No. 2,091,285.

The invention will be described in connection with a thread-advancing reel of the type shown, described and claimed in copending application Serial No. 652,089, filed January 16, 1933, now Patent No. 2,210,914. Said reel comprises a shaft about which are mounted two reel members, each reel member comprising a spider supporting a rigidly mounted set of longitudinally extending bars. The bars of each reel member lie between the bars of the other, so that the two reel members occupy substantially the same space. One reel member rotates concentrically with the shaft, while the other is mounted so as to rotate about an axis displaced laterally from the axis of the shaft. The axis of rotation of the laterally displaced reel member is slightly inclined to the axis of rotation of the shaft.

The action of such a reel is to move the bars of the respective reel members radially outward with respect to the adjacent bars of the other reel member by virtue of the lateral displacement of the axes thereof, as a result of which each reel member alternately carries the turns of thread wound upon the reel. Due to the inclined relation of the axes of rotation of the two reel members, as each set of bars retracts with respect to the other set, the thread is transmitted from each set to the other at a point somewhat forward of the previous position of the thread. As a result, the thread is continuously but temporarily stored upon the reel in substantially helical turns, being meanwhile advanced substantially axially thereof.

A reel of this type embodying the principles of the invention is illustrated in the accompanying drawings. In such drawings, Figure 1 represents a vertical section taken longitudinally through the reel and its housing. Figure 2 represents a transverse section on a reduced scale through the reel and its housing as seen from line 2—2 of Figure 1. Figure 3 is a perspective of a reel member embodying the invention.

Referring to Figures 1 and 2 of the drawings, housing 4 contains reel 5, a reagent distributor 6 and transfer mechanism 7. The reagent distributor 6 discharges a processing liquid on the reel, thus effecting one of the processing steps to be performed in the preparation of the finished thread. When the thread end reaches the discharge end of the reel, it is severed by transfer mechanism 7, which is equipped with blades for cutting the thread in order to provide a free leading end. The free end is then detached, with or without assistance from the transfer mechanism, and brought to the next succeeding reel, which is preferably situated below reel 5. The thread then commences to wind along the succeeding reel, being subjected thereon to another treatment.

As previously mentioned, the substantially axial advance of the thread along the reel is caused by the offset and inclined relation of the axes of rotation of the two reel members of which the reel is comprised. As may be seen in Figures 1 and 2, reel members 9 and 10 consist of bars 11 and 12 which are rigidly mounted on spiders 13 and 14, respectively. In the illustrated embodiment of the invention, the several bars and corresponding supporting spider of each reel member are integral. A shoulder 47 is provided on each bar at the end thereof at which the bar is supported by the spider. The bars and spiders can be composed of any material which has the required strength but which is neither corroded by the reagents used for treating the thread nor chemically decomposed to an extent such as to contaminate the thread.

The reel as a whole is supported on, and rotates about, a shaft 15 which may carry similar reels, such as 5a, in horizontal alignment in position to subject the thread carried thereon to the same treatment. Reel member 10 is mounted upon shaft 15 so as to rotate concentrically therewith. Spider 14, which constitutes part of reel member 10, is mounted on a bushing 17 by means of cement 18, the bushing 17 being locked to the shaft 15 by means of a set screw 19 fitting into a groove 21 in the shaft. A sealing composition 22 is filled in over the set screw 19 in order to protect the metal against corrosion by the processing medium.

The other reel member 9 is not mounted directly on shaft 15 but rotates thereabout on a sleeve 23 which is non-rotatably held by a bakelite nut 24 engaged with the sleeve. This nut is in turn held against rotation by a plate 25 attached to housing 4. The reel member 9 is cemented by a layer of cement 26 to bearing 27, the bearing rotating on the fixed sleeve 23. It will be observed that the sleeve 23 is eccentrically positioned around the shaft 15, thus laterally offsetting the axis of rotation of reel member 9 with respect to the axis of rotation of reel member 10. The axis of the outer surface of the sleeve 23 is also inclined to the axis of shaft 15. Thus reel member 9 rotates about an axis offset from and inclined to the axis of rotation of reel member 10.

Shaft 15 is driven through stub shaft 28, to which it is connected by tongue and groove means and a pin 29. Stub shaft 28, in turn, is driven through a coupling 31 which may be attached to another reel shaft or directly to a gear transmission from a power source. The stub shaft 28 and the coupling 31 are mounted on the end cover 32 of housing 4 by means of bolts 33 and associated parts.

Access to metal shaft 15 of corrosive liquids used in treating the thread is prevented by shaft housing 34, which is of bakelite or other chemically resistant material, packing 35, and stuffing boxes 36. The plane of contact between hubs 37 and 38 of the reel members 9 and 10, respectively, present a problem in this respect, since due to the eccentricity between the two reel members the axes of the hubs do not coincide. To prevent access of corrosive liquids to the metal parts of the structure and to retain oil between the moving surfaces for purposes of lubrication, a flexible boot 39 is provided which snugly engages each hub and maintains a tight seal despite relative movement of the parts.

In the operation of the reel, shaft 15 is driven through the shaft 28 and associated coupling 31 and, in turn, drives reel members 10 of as many reels as may be mounted on the same shaft. Each reel member 10, being pinned to shaft 15, rotates therewith and drives the cooperating reel member 9 by engagement of the oppositely directed bars of the respective members as shown in Figure 2 of the drawings. The two reel members rotate together and thread led onto the surface of the reel commences to advance along the reel in a large number of closely spaced substantially helical turns. As the thread advances, it is showered with the desired treating liquid from the distributor 6, the liquid being collected in trough 40, constituted by the bottom part of housing 4, and returned, if desired, to the manifold 41 with which distributor 6 is connected.

When the thread reaches the end of the reel, it is severed by transfer device 7 to provide a new leading end. Transfer device 7 embodies a shroud 43 rotatable independently of the reel and a plurality of cutting blades 44 which operate to sever the thread when the leading turns reach the plane of member 43. The newly formed free end then runs tangentially off the reel, being aided by windage of the member 43. In the normal operation of the transfer device, the newly formed leading end drops by gravity, with or without assistance, to the next lower reel, where it commences to advance thereover in the same fashion.

Occasionally, however, faulty operation of a transfer device results in an overrunning of the thread beyond the discharge end of the reel. In the illustrated embodiment of the invention, overrunning of the thread beyond either end of the reel; for example, overrunning of the portion of the thread cut off by the transfer device 7, is prevented by shoulders 47 formed on the bars of each reel member at the ends thereof connected to the corresponding supporting spider. The projection of these shoulders beyond the thread-bearing periphery of the reel at each end thereof effectively prevents the thread from passing over the reel at either end thereof, thereby making it impossible for the thread to wind itself about the shaft or parts of the reel other than the thread-bearing portion thereof. This is an advantage of considerable practical importance, particularly in view of the difficulty entailed in removing the thread in such circumstances.

Obviously, projecting means of various other types may be provided at the ends of the bar members or at the end of the reel for the purpose of preventing the overrunning of the thread.

Various modifications may be made in the illustrated embodiment without departing from the spirit of the invention; indeed, the invention may be applied to reels of other types and reels employed for other uses without departing from the spirit of the present invention. In the appended claims, the term "thread" is intended to include, besides thread per se, all types of strip material capable of being advanced on a reel of the type embraced by the present invention. It is intended that the patent shall cover, by suitable expression in the appended claims, whatever features of patentable novelty reside in the invention.

What is claimed is:

1. A reel upon which thread may be continuously but temporarily stored in spaced, substantially helical turns which are advanced axially of the reel comprising two rotatable reel members of substantially circular cross section each of which is made up of a plurality of bars extending longitudinally from and rigidly fixed to a supporting member, the bars of each reel member being disposed alternately to the bars of the other reel member, and, associated with said reel, means extending radially from one of said supporting members for preventing the axial advance of the thread beyond said radially extending means, the axial advance of the thread over the thread-bearing periphery of the reel being continued until the thread comes into contact with said radially extending means.

2. A reel upon which thread may be continuously but temporarily stored in spaced, substantially helical turns which are advanced axially of the reel comprising a first supporting spider to which is rigidly fixed a first set of longitudinally extending bars; a second supporting spider to which is rigidly fixed a second set of longitudinally extending bars, the bars of said second set being disposed alternately to the bars of said first set; means for rotating said spiders, including the bars associated therewith, about noncoincident axes; and means associated with at least one of said supporting spiders extending beyond the periphery of one of said reel members adjacent the supported portion thereof to prevent axial advance of the thread beyond said extending means, the axial advance of the thread over the thread-bearing periphery of the reel being continued until the thread comes into contact with said extending means.

3. A reel upon which thread may be continuously but temporarily stored in spaced, substantially helical turns which are advanced axially of the reel comprising a first rigid reel member of substantially circular cross section made up of a plurality of longitudinally extending bars supported at one end of the reel member; a second rigid reel member of substantially circular cross section made up of a plurality of longitudinally extending bars supported from one end of the reel member, said second reel member being adapted to rotate about an axis inclined to the corresponding axis of rotation of said first reel member; means by which the bars of said reel members are supported; and circumferentially disposed shoulders associated with the bars of at least one of said reel members for preventing the axial advance of the thread beyond said circumferentially disposed shoulders, the axial advance of the thread over the thread-bearing periphery of the reel being continued until the thread comes into contact with said circumferentially disposed shoulders.

WALTER F. KNEBUSCH.